United States Patent
Scott et al.

(10) Patent No.: US 8,840,947 B2
(45) Date of Patent: Sep. 23, 2014

(54) WHEY OR RAW MILK DEMINERALISATION AND FRACTIONATION

(75) Inventors: Stephen Niall Scott, Gloucestershire (GB); Ashok Krishnapillai, Gloucestershire (GB)

(73) Assignee: Separation Technologies Investments Limited (GB)

( * ) Notice: Subject to any disclaimer, the term of this patent is extended or adjusted under 35 U.S.C. 154(b) by 307 days.

(21) Appl. No.: 13/257,217

(22) PCT Filed: Mar. 17, 2010

(86) PCT No.: PCT/GB2010/000478
§ 371 (c)(1), (2), (4) Date: Jan. 27, 2012

(87) PCT Pub. No.: WO2010/106319
PCT Pub. Date: Sep. 23, 2010

(65) Prior Publication Data
US 2012/0121781 A1 May 17, 2012

(30) Foreign Application Priority Data
Mar. 17, 2009 (GB) .................................. 0904557.6

(51) Int. Cl.
*A23L 1/29* (2006.01)
*A23C 9/142* (2006.01)
*A23C 9/146* (2006.01)

(52) U.S. Cl.
CPC ............. *A23C 9/1425* (2013.01); *A23C 9/1422* (2013.01); *A23C 2210/206* (2013.01); *A23C 9/146* (2013.01); *A23C 9/1427* (2013.01)
USPC ............. 426/583; 426/74; 426/239; 426/271; 426/491; 426/580

(58) Field of Classification Search
CPC ...... A23C 9/1425; A23C 9/142; A23C 9/146; A23C 21/00; A23C 2210/206
USPC .................... 426/580, 583, 74, 271, 239, 491
See application file for complete search history.

(56) References Cited

U.S. PATENT DOCUMENTS

| 5,118,516 | A | * | 6/1992 | Shimatani et al. ............ 426/271 |
| 6,323,008 | B1 | * | 11/2001 | Pelletier et al. .................. 435/84 |
| 2007/0166447 | A1 | | 7/2007 | Dunker |
| 2009/0048440 | A1 | * | 2/2009 | Felo et al. ..................... 536/55.3 |
| 2010/0038313 | A1 | | 2/2010 | Baudouin |
| 2010/0055289 | A1 | * | 3/2010 | Kallioinen et al. ........... 426/587 |
| 2011/0209228 | A1 | * | 8/2011 | Cocks et al. ...................... 800/4 |

FOREIGN PATENT DOCUMENTS

| FR | 2487642 | | 2/1982 |
| WO | WO 2005/067962 | | 7/2005 |
| WO | WO 2007/051475 | | 5/2007 |
| WO | 2008/053102 | * | 5/2008 ................... 426/580 |
| WO | WO 2008/053102 | | 5/2008 |
| WO | WO 2008/077071 | | 6/2008 |

OTHER PUBLICATIONS

Int'l Search Report & Written Opinion issued in app. No. PCT/GB2010/000478 (2010).

* cited by examiner

*Primary Examiner* — Helen F Heggestad
(74) *Attorney, Agent, or Firm* — Barnes & Thornburg LLP

(57) ABSTRACT

A process for the demineralization and fractionation of cheese whey or raw milk comprising the steps of: a) subjecting the whey or raw milk to ultrafiltration to provide a retentate fraction and a permeate fraction; b) concentrating the permeate fraction by means of nanofiltration; c) subjecting the nanofiltration retentate to ion permeation chromatography at elevated temperatures of between 50° C. and 80° C. using an appropriate resin; and d) eluting the nanofiltration retentate with water in various fractions to obtain fractions which may be low in mineral content and/or high in 3'-sialyl lactose content and/or high in other desirable components.

16 Claims, No Drawings

WHEY OR RAW MILK DEMINERALISATION AND FRACTIONATION

CROSS REFERENCE TO RELATED APPLICATIONS

This application is a U.S. nationalization under 35 U.S.C. §371 of International Application No. PCT/GB2010/000478, filed Mar. 17, 2010, which claims priority to United Kingdom application no. GB 0904557.6, filed Mar. 17, 2009. The disclosures set forth in the referenced applications are incorporated herein by reference in their entireties.

The present invention relates to an improved process for the demineralisation of whey or raw milk.

Cheese production generally involves the coagulation of milk protein (casein) to trap milk solids and milk fat into a curd matrix either by the action of enzymes on the milk or by reducing the pH of the milk using an appropriate acid. This curd matrix is then consolidated to express a liquid fraction, known as cheese whey. Cheese whey contains milk solids that are not held in the curd matrix, particularly milk saccharides and soluble proteins. Whey comprises 80-90% of the total volume of milk used in the cheese making process and contains more than half the solids from the original whole milk, including 20% of the protein and most of the lactose and has a very high organic content.

The disposal of whey has always been a problem for the dairy industry due to its high organic content. It is now possible to recover soluble proteins from the whey and value from the lactose and it is clearly desirable to recover as much of the organic content as possible to reduce the organic load of the effluent stream and to obtain a higher return from the whey. A major effort is underway by cheese processing companies to develop uses for this commodity.

Whey as a by-product of the cheese manufacturing industry consists of approximately 6 to 6.5% solids. The whey solids are composed of 75 to 80% lactose, 8.5 to 9.2% true protein, 2.5 to 3% NPNs, 8 to 12% ash and less than 1% fat. Sweet whey is produced during the manufacture of hard cheeses such as Cheddar and Gouda which are rennet-coagulated. Acid whey is produced during the manufacture of cheeses such as cottage cheese, and has a lower proportion of protein with a correspondingly higher proportion of ash. The whey composition can vary depending on factors such as breed of cows, seasonal variations, different cheese starter cultures or rennet types.

There are numerous techniques available for the conversion of sweet whey into baby food by the partial or near total removal of minerals. The process primarily involves the use of resin technology alone or a combination of resin and membrane technology. The resins used are a combination of cation and anion resin, both of which require the considerable use of chemicals for the cleaning process. In addition, the cleaning effluents require treatment and disposal. Since the quantity of chemicals required is a direct function of the ash content in whey and acid whey has a lower proportion of protein and a higher proportion of ash than has sweet whey, it has traditionally been considered that the demineralisation of acid whey by ion exchange processes and its conversion to baby food is expensive because of the volumes of chemicals required.

It is an aim of the present invention to provide an improved process for the demineralisation and fractionation of whey or raw milk with minimal or no use of chemicals and wherein the source of the whey or milk has a reduced bearing on the cost of the overall process.

Accordingly, a first aspect of the present invention provides a process for the fractionation of whey or raw milk comprising the steps of:

a) subjecting the whey or milk to ultrafiltration (UF) to provide a retentate fraction and a permeate fraction;

b) concentrating the permeate fraction by means of nanofiltration (NF) and c) subjecting the nanofiltration retentate to ion permeation chromatography at elevated temperatures of between 50 and 80° C. using an appropriate resin; and d) eluting the nanofiltration retentate in fractions from the resin using water as the eluant.

The process of the present invention enables the demineralisation of whey or raw milk without the use of chemicals whilst simultaneously obtaining products of commercial value. The process is particularly suitable for the demineralisation of whey to provide products such as 3' sialyl lactose, from the effluent stream by collecting two main streams split from the ion permeation chromatography eluate.

The retentate fraction produced from step a) is rich in protein with low mineral levels while the permeate fraction is a lactose stream containing the major concentration of minerals. In step b) the NF permeate contains a large proportion of monovalent ions as well as some urea, etc. The concentrated retentate is primarily composed of lactose, some protein, NPN and minerals.

The chromatographic separation resin is preferably CR1310K as supplied by Rohm and Haas. However other suitable resins exist. Examples include, but are not limited to, those supplied under the trade names CR1310Ca & Na or CR1320 Ca, K or Na by Rohm and Haas, DOWEX Monosphere 99Ca/320 by Dow or Diaion UBK530 by Mitsubishi or PCR145K by Purolite.

Preferably step b) raises the solids content to at least 20%, more preferably at least 25% or more. Any NF membrane with a molecular weight cut-off (MWCO) of between 90 to 350 Daltons may be used for this step. It is preferable to work close to the upper MWCO of the component of interest (i.e. lactose) and thus a membrane having a MWCO of 320 to 342 is preferred. Specific examples of such membranes include those supplied under the trade names Koch Membranes TFC-SR2, SelRO MPF-44.

Step c) is preferably carried out at an elevated temperature between 65 and 75° C. Loading volumes on the ion permeation resin may be between 10 and 25% of the resin volume. However it is desirable to limit it to a maximum of 15% of the resin volume to reduce lactose loss.

A first fraction retained from the elution in step c) is the mineral rich fraction, which contains over 98% of the minerals and approximately 5 to 10% of the lactose, along with a major proportion of the NPNs. This fraction also contains other components of commercial value, such as the oligosaccharides 6'-sialyl lactose and 3'-sialyl lactose. Since the process is carried out using water, these components of commercial value are not destroyed and can therefore be recovered, concentrated and/or isolated.

A second fraction retained from the elution in step c) is the lactose stream, which is collected separately.

It is to be appreciated that the individual fractions eluted from the ion permeation chromatography column can be cut at strategic points to give best yields and/or to give best purity.

According to a preferred aspect of the present invention, the process further comprises concentrating the lactose-rich second fraction by reverse osmosis (RO) or NF. More preferably, the concentrated lactose-rich fraction is added back to the UF retentate fraction obtained from step a) to obtain demineralised whey. By this technique, the degree of demineralisation may be controlled by the degree of retention by the UF plant.

It is generally considered economic to concentrate the solids by UF in step a) to no more than 25%, which in effect is a 20 to 30-fold concentration of the protein. This results in a demineralisation rate of between 85 and 90%. To obtain greater than 90% demineralisation, it may be necessary to diafilter the UF retentate further to remove more of the ash. The entire permeate may then be pooled and may be concentrated by NF prior to the ion permeation chromatography step c) as described above.

According to another aspect of the present invention, the process further comprises concentrating the mineral-rich first fraction by ultrafiltration to provide a product rich in oligosaccharides, specifically 3'-sialyl lactose and/or calcium phosphate. The calcium phosphate may be used in baking powders, dental products and in the production of fertilizers, plastics and glass.

More preferably, the first fraction retained from the elution of the ion permeation chromatography column, containing the minerals, some NPNs and 3'-sialyl lactose, may be collected and subjected to a mild demineralisation process to remove a certain level of the minerals and thereby obtain a fraction rich in 3'-sialyl lactose. This fraction may also be subjected to an isolation step whereby, following demineralisation, the 3'-sialyl lactose can be isolated by being taken up on an appropriate anion resin (either a weak base or a strong base). The material of interest may then be eluted using a solution of ammonium hydroxide, formic acid, acetic acid or combinations thereof to obtain a volatile solution containing sufficient counter ions to elute the 3'-sialyl lactose from the resin. The advantage of such a volatile system is that the material can then be dried directly with no residues being left behind. Alternatively, elution may be carried out using a solution containing chloride, acetate or formate as the anion and calcium, sodium, ammonium or potassium as the cation. In such an elution process, the material must then be subjected to an additional process to remove the excess cations and anions either using a membrane system or a resin system or a combination of the two.

The present invention provides the major advantage that no chemicals are required in the ion permeation chromatography process. Another significant advantage of this system is that since there are no chemicals used on the ion permeation chromatography resin, the entire eluate from the resin can be subjected to reverse osmosis (RO) and thereby a major proportion of the water can be recovered and recycled safely. This allows for the concentration of the eluate and thereby contributes to savings further downstream.

Since acid whey has a lower proportion of protein and a higher proportion of ash than has sweet whey, it has traditionally been considered that the demineralisation of acid whey by ion exchange processes and its conversion to baby food is expensive because of the volumes of chemicals required. However, an advantage of the present invention is that acid whey can be demineralised at no extra cost. In essence, the source of whey has little bearing on operational costs as demineralisation is achieved by a Combination of ultrafiltration and ion permeation or exclusion, without the use of chemicals.

The present invention will now be further illustrated by reference to the following examples.

EXAMPLE 1

The primary step in the current invention for all examples is an ultrafiltration (UF) step whereby a major proportion of the protein in cheese whey is removed. The UF step may include the production of WPC35, 60, 80 or 85. A by-product of this process is the whey permeate at approximately 4 to 7% solids which is composed of approximately 90 to 95% lactose, 1 to 5% protein (NPNs and true protein), 4 to 7% ash and 0.05 to 0.25% 3'-sialyl lactose (3-SL) and other oligosaccharides. At certain times of the year, the proportion of 3-SL may be significantly higher, up to as much as 0.5% by weight of the solids.

The permeate/lactose stream from UF is subjected to NF to raise the solids by 20 to 25%. The choice of NF membrane can be significant. Most NF membranes are in the 100 Dalton cut-off (example: GE membranes DK, DL, Koch membrane TFC-HR). However, they require high pressures to work efficiently. Other NF membranes have a higher molecular cut-off of between 200 and 300 Daltons. Any NF membrane with a molecular weight cut-off (MWCO) of between 90 to 350 Daltons can be used, the upper cut-off point being limited by the molecular weight of the component of interest: lactose in this case, viz. 342.29648 Daltons. Working close to the upper MCWO without losing lactose is significantly advantageous because the process can be operated at a significantly lower working pressure which is an energy saving. Specific examples of such membranes are Koch Membranes TFC-SR2, SelRO MPF-44.

Once concentrated, the lactose stream is then subjected to fractionation on an appropriate ion permeation (or ion exclusion) resin such as CR1310K at 70 to 80° C. The first fraction, containing the minerals, is either discarded or treated further as the case may be.

The second fraction, containing lactose, is collected, concentrated by RO or NF, and then recombined with the protein from the UF step to give demineralised whey. Loading volumes on the ion permeation resin can be between 10 and 25% of the resin volume. However it is desirable to limit it to a maximum of 15% of the resin volume to reduce lactose loss. The column is maintained at a constant temperature of between 50 and 80° C. It is desirable to keep it between 65 and 75° C. Below 65° C. thermopholic bacterial growth could be an issue and above 75° C. air bubbles formed in the bed could be a problem. To reduce and/or avoid air bubbles it may be desirable to run the resin column at positive pressures using air or gas pressure on top of the resin bed.

It is also possible to concentrate the 6% whey (acid or cheese whey) to a solids content of 20 to 30% using NF with a MCWO sufficient to retain the lactose. Concentration can also be achieved by evaporation. This is then subject to fractionation using the ion exclusion resin. The first fraction contains all the protein, oligosaccharides and minerals, while the second fraction contains the lactose. Both fractions are collected. Fraction 1 is subjected to NF to retain the protein and oligosaccharides in the retentate as well as concentrate it and remove some of the monovalent ions and water in the permeate. The lactose fraction is concentrated by NF, and this is combined with the demineralised protein concentrate to yield demineralised whey. The level of demineralisation during UF is determined by the level to which the material is ultrafiltered.

The following example compares the demineralisation of sweet whey or cheese whey using a conventional ion exchange process and using the process of the present invention

EXAMPLE 2

In an ion exchange demineralisation process, sweet whey at 6% solids is subjected to nanofiltration to remove approximately 40% of the monovalent ions. This is then subject to demineralisation using cation and anion resins. The chemical requirements to process one tonne of dry matter (post NF) is approximately 0.14 tonnes of 36% HCl, approximately 0.09 tonnes of 48% NaOH and 12.5 tonnes of process quality water. In addition, this produces approximately 0.202 tonnes of effluent sludge, containing the solid matter from whey as well as the chemicals used (HCl and NaOH). Additional processing steps prior to ion exchange may also be performed such as electrodialysis to reduce the load on the ion exchange resins and thereby reduce the chemical consumption. This, however, results in significant power consumption and it is necessary to use chemicals, albeit a smaller quantity, to obtain the final demineralisation target.

In contrast, the present invention produces approximately 0.14 tonnes of effluent sludge per tonne of dry matter processed, consisting mainly of ash and NPNs from whey. Since there has been no use of HCl and/or NaOH to clean the resins, the effluent is quite readily subjected to RO to recycle the water. An additional benefit is the fact that the effluent stream also contains valuable components that have not been damaged by chemicals, and these can be isolated by further downstream processing. Typical examples are the milk oligosaccharides 6-sialyl lactose and 3'-sialyl lactose. The effluent stream may be subjected to further demineralisation using a resin of the type Sephadex G-25, G-15 or G-10 whereby the minerals are removed and the 3'-sialyl lactose can be obtained at levels of 2 to 5% or more by weight of solids. It has been possible to isolate 3'-sialyl lactose from the effluent stream, obtaining it at levels of 15 to 40% by weight of solids, as described in the Applicant's co-pending unpublished application.

Should acid whey be used as the starting material rather than sweet whey, the chemical content of the starting material is considerably greater and the corresponding quantity of sludge produced is also significantly higher in the former process. However, with the present invention, the quantity of sludge produced should be no greater than 0.18 tonnes per tonne of dry matter processed.

The present invention is also applicable to the demineralisation of raw milk permeate, as detailed in the Example below.

EXAMPLE 3

Trials were carried out using raw milk permeate.

Raw milk permeate obtained from the ultrafiltration of raw milk was subjected to nanofiltration to obtain a retentate with a solids content of around 20%. This NF retentate was subjected to ion permeation chromatography on a 50 mm diameter column and about 900 mm resin bed depth with a water jacket to maintain the temperature uniform at 70° C. The column was eluted with deionised water at a flow rate of about 1 to 2 bv/h.

The resulting eluate was split into two main fractions. The initial fraction contained ~98% of all the ash, ~95% of all the sialyl oligosaccharides and ~90% of all the protein including ~98% of all the NPN. The concentration of 3'sialyl lactose was measured at >1% by weight of solids. However, the ash content of this material is rather high, which can be removed by additional chromatography on Sephadex G25 or G10 or by ion exchange to obtain a mineral free 3-SL rich fraction. The second fraction was virtually ash free with less than 1% protein and >95% of all the lactose. The ash free lactose stream is combined with the original UF retentate to obtain a >90% demineralised milk.

The invention claimed is:

1. A process for the demineralisation and fractionation of whey or raw milk the process consisting essentially of:
   a) subjecting the whey or raw milk to ultrafiltration to provide a retentate fraction and a whey permeate;
   b) concentrating the whey permeate by nanofiltration to provide a concentrated lactose rich retentate;
   c) subjecting the nanofiltration retentate to ion permeation or ion exclusion chromatography at elevated temperatures of between 50° C. and 80° C., using an appropriate resin;
   d) eluting the nanofiltration retentate in various fractions from the resin using water as the eluent;
   e) eluting a lactose rich fraction from (d) with low mineral content from the ion permeation chromatography resin; and
   f) adding the lactose rich fraction from (e) to the ultrafiltration retentate fraction obtained from (a) to provide demineralised whey.

2. A process according to claim 1 wherein the source material is cheese or acid whey.

3. A process according to claim 1, wherein step b) raises the solid content of the whey permeate by at least 20%.

4. A process according to claim 1, wherein whey permeate is concentrated in step b) using a nanofiltration membrane having a molecular weight cut-off of between 320 and 342 Daltons.

5. A process according to claim 1, wherein step c) is carried out at a temperature between 65° C. and 75° C.

6. A process according to claim 1, wherein loading volumes on the ion permeation resin is limited to a maximum of 15% of resin volume.

7. A process according to claim 1 further comprising concentrating the lactose rich fraction obtained in step e) by nanofiltration or reverse osmosis.

8. A process according to claim 1 further comprising subjecting the ultrafiltration retentate fraction to diafiltration before the diafiltration permeate is concentrated by nanofiltration prior to the addition of the lactose rich fraction.

9. A process according to claim 1, further comprising eluting in step d) a mineral rich fraction low in lactose containing 3'-sialyl lactose from the ion permeation resin.

10. A process according to claim 9 further comprising subjecting the mineral rich fraction to a mild demineralisation step to remove a certain level of minerals and thereby obtain a fraction rich in 3'-sialyl lactose.

11. A process according to claim 10 further comprising isolating the 3'-sialyl lactose by taking it up on an appropriate anionic resin.

12. A process according to claim 11 further comprising eluting the 3'-sialyl lactose from the anionic resin using a solution of ammonium hydroxide, formic acid, acetic acid or combinations thereof.

13. A process according to claim 11 further comprising eluting the 3'-sialyl lactose from the anionic resin using a solution containing chloride, acetate or formate as the anion and calcium, sodium, ammonium or potassium as the cation.

14. A process according to claim 12, further comprising drying the eluate from the anionic resin to provide a 3'-sialyl lactose powder product.

15. A process according to claim 1, further comprising subjecting the concentrated 3'-sialyl lactose eluate to an additional demineralisation step using a membrane system or a resin system or a combination of the two.

16. A process according to claim 1 wherein the source material is raw milk.

* * * * *